US010183729B2

(12) United States Patent
Haumonte et al.

(10) Patent No.: US 10,183,729 B2
(45) Date of Patent: Jan. 22, 2019

(54) WATER SURFACE AUTONOMOUS VESSEL

(71) Applicant: KIETTA, Marseilles (FR)

(72) Inventors: Luc Haumonte, Marseilles (FR); Laurent Velay, Marseilles (FR)

(73) Assignee: KIETTA, Marseilles (FR)

(*) Notice: Subject to any disclaimer, the term of this patent is extended or adjusted under 35 U.S.C. 154(b) by 0 days.

(21) Appl. No.: 15/381,705

(22) Filed: Dec. 16, 2016

(65) Prior Publication Data
US 2017/0183064 A1    Jun. 29, 2017

(30) Foreign Application Priority Data

Dec. 24, 2015 (FR) ................................. 15 63321

(51) Int. Cl.
| | |
|---|---|
| *B63B 21/66* | (2006.01) |
| *B63B 3/26* | (2006.01) |
| *B63B 21/16* | (2006.01) |
| *B63B 35/00* | (2006.01) |
| *G01V 1/38* | (2006.01) |

(52) U.S. Cl.
CPC ............... *B63B 21/66* (2013.01); *B63B 3/26* (2013.01); *B63B 21/16* (2013.01); *B63B 35/00* (2013.01); *G01V 1/3808* (2013.01); *G01V 1/3843* (2013.01); *B63B 2003/265* (2013.01); *B63B 2035/007* (2013.01); *B63B 2205/02* (2013.01); *B63B 2211/02* (2013.01); *G01V 2200/14* (2013.01)

(58) Field of Classification Search
CPC ........... B63B 21/66; B63B 21/16; B63B 3/26; B63B 35/00; G01V 1/3843

USPC ............................................... 114/254
See application file for complete search history.

(56) References Cited

U.S. PATENT DOCUMENTS

| | | | | |
|---|---|---|---|---|
| 3,379,162 A | * | 4/1968 | Chatten et al. | ....... B63B 21/663 114/243 |
| 3,961,589 A | * | 6/1976 | Lombardi | ................ B63G 8/42 114/244 |
| 8,087,372 B1 | * | 1/2012 | Ruffa | ................... B23D 29/002 114/254 |
| 2010/0226204 A1 | | 9/2010 | Gagliardi et al. | |

FOREIGN PATENT DOCUMENTS

| | | |
|---|---|---|
| DE | 102013105593 A1 | 12/2014 |
| FR | 1561077 A | 3/1969 |
| FR | 2940838 A1 | 7/2010 |
| FR | 2945356 A1 | 11/2010 |
| FR | 2961317 A1 | 12/2011 |

(Continued)

*Primary Examiner* — Stephen P Avila
(74) *Attorney, Agent, or Firm* — Norton Rose Fulbright US LLP

(57) ABSTRACT

The invention notably relates to a water surface autonomous vessel having a hull and configured to be connected, through a lead-in cable having a negative buoyancy, to an end of a seismic cable having a neutral buoyancy and adapted for midwater data acquisition, wherein the water surface autonomous vessel comprises a winch for varying the deployed length of the lead-in cable, and the hull of the autonomous vessel forms a conduct at the back of the autonomous vessel in the direction of deployment of the lead-in cable.
This provides an improved solution for seismic prospecting in aquatic mediums.

17 Claims, 4 Drawing Sheets

(56) References Cited

FOREIGN PATENT DOCUMENTS

| FR | 2990028 A1 | 11/2013 |
|---|---|---|
| GB | 2517756 A | 3/2015 |
| WO | 20140176239 A1 | 10/2014 |

\* cited by examiner

WATER SURFACE AUTONOMOUS VESSEL

FIELD OF THE INVENTION

The present invention relates to the field of seismic prospecting in aquatic mediums (sea or lake).

BACKGROUND

Seismic prospecting in aquatic mediums is conventionally performed by placing a set of parallel submerged seismic cables carrying a plurality of sensors (hydrophones or hydrophone/geophone combinations) spaced apart along the cable, the set of cables being towed by a seismic vessel. A source capable of creating an acoustic wave in the medium, generally in the form of an array of air guns, is towed by the seismic vessel at a distance from the seismic cables. The wave thus formed propagates to the water bottom, then further to the underlying subsoil, which gives rise to reflections at the interfaces between the geological layers forming the subsoil, which are collected by said submerged sensors. All of the information is then processed to produce a three-dimensional (3D) image of the different geological layers of the subsoil, generally used to determine the presence of hydrocarbon reservoirs.

Document FR2940838A1 discloses a seismic prospecting technique in which a set of parallel submerged seismic cables of neutral buoyancy are positioned midwater, and each cable is connected through lead-in cables to respective surface autonomous recording vessels (hereinafter "ARVs"), sometimes called "drones", at each of its two ends and subject to a tension exerted at its ends by the ARVs, so that the cables can be kept stationary or quasi-stationary during the acquisition of seismic signals. Various aspects related to this technique have been disclosed in FR2945356A1, FR2961317A1 and FR2990028A1.

The technique disclosed in document FR2940838A1 provides, in addition to other advantages presented in this document, great flexibility in the positioning of the seismic cables as compared with the conventional method in which the entire set of cables is towed by a seismic vessel; it enables in particular the cables to be positioned at a water depth much greater than the depth in the range of 5 to 15 meters which is a constraint of the aforementioned conventional method.

Within this context, there is still a need for an improved surface autonomous vessel.

SUMMARY OF THE INVENTION

It is therefore provided a water surface autonomous vessel having a hull and configured to be connected, through a lead-in cable having a negative buoyancy, to an end of a seismic cable having a neutral buoyancy and adapted for midwater data acquisition, wherein the water surface autonomous vessel comprises a winch for varying the deployed length of the lead-in cable, and the hull of the autonomous vessel forms a conduct at the back of the autonomous vessel in the direction of deployment of the lead-in cable.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
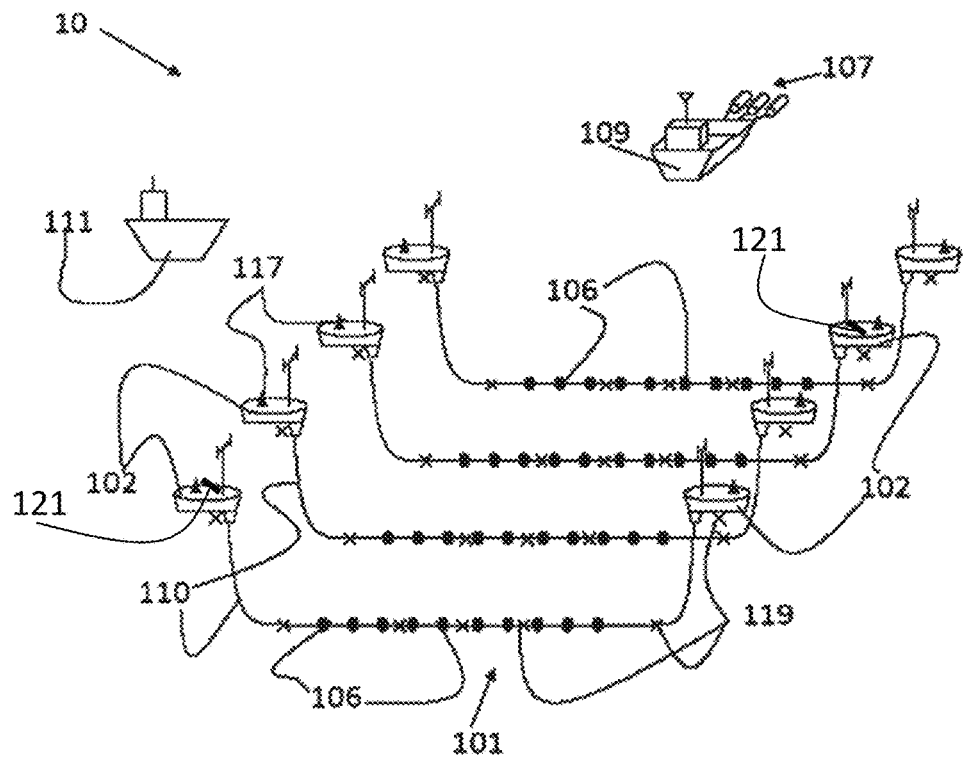
FIG. 1 shows a perspective view of a seismic acquisition system.

The water surface autonomous vessel can be integrated to a global process for seismic prospection with a seismic acquisition system that comprises a set of (at least one or two, or strictly more than three) seismic cables each configured for data acquisition. Specifically, any combination of at least one of the cables of the system (for example, all the cables of the system) may be connected at one or both ends to a realization of the water surface autonomous vessel.

Throughout the process, the system is deployed in an aquatic medium (i.e. sea or lake), and for data acquisition, one or more seismic sources, which can be impulsive sources (for example in the form of an array of air guns) or marine vibrators, towed by a respective vehicle or boat) creates a wave in the aquatic medium, whose reflection(s) at interfaces between geological layers underneath the water bottom are collected by the seismic sensors carried by the cables of the system (e.g. as described in FR2990028A1). The data thereby acquired can then be processed to produce a 3D image of the reservoir. Throughout the process, the cables of the contemplated set are kept midwater suitably at a depth superior to 5 meters and which can reach 300 meters or more. The depth is determined so as to meet the set of specific data quality requirements pertaining to the zone to be prospected. A typical value can be on the order of 100 meters or between 100 and 200 meters. Each cable includes seismic sensors (suitably hydrophone and possibly geophone) spaced apart along the cable. Throughout the process, the cables are arranged laterally aligned (one with respect to another), so as to form a 2D horizontal array of sensors and thereby provide adequate coverage of the zone to be prospected. The cables may be maintained parallel one to another (e.g. as much as possible, with respect to other constraints).

Furthermore, any combination of at least one of the cables of the system (for example, all the cables of the system) may also respect any or a combination of the following requirements.

The system enables the cables to be maintained during acquisition in a stationary or pseudo-stationary manner) either relative to the aquatic medium, or relative to the bottom of the water (i.e. thus relative to the terrestrial referential). This can be performed according to FR2940838A1, which is incorporated herein by reference (notably regarding such positioning of the cable). While maintaining a stationary or pseudo-stationary position, the movement of the cable may also be restricted by a maximum track curvature value in the water, as described in FR2961317A1, which is incorporated herein by reference (notably regarding the definition and/or value of said maximum track curvature value in the water and/or how to respect such constraint). This allows relatively low mechanical and energy constraints.

In order to achieve such positioning, both end(s) of the cable are connected to respective surface vessels (for example aforementioned ARVs) through respective lead-in cables. The ARVs are adapted to control position of the cable by exerting tension at its ends through the lead-in cables. In such a context, the two ARVs allow a prompt compensation of the current anytime, even in case of quickly changing currents. Furthermore, owing to the speeds at stake (for usual sea currents), the ARVs can be relatively small in terms of size and/or mechanical capacities (relative to conventional seismic vessels). The ARVs may for example have a length inferior to 20 meters or 12 meters (e.g. about 8 meters), a width inferior to 15 meters or 10 meters (e.g. about 6 meters), and a height—excluding a mast—inferior to 12 meters or 8 meters (e.g. about 4.5 meters) and each ARV is mechanically adapted for pulling the cable at any speed up to a predetermined maximum speed—relative to the water which can be equal to 5 knots (about 9.26 km/h). As stated above, the system enables the seismic cables to be kept stationary or quasi-stationary, which implies a speed in the range of 0 to 2 knots relative to the water medium, but it also enables the cables to be moved at greater speeds, as suitable for displacements between acquisition stations or for transit to a zone to be prospected or to meet specific operational requirements. The seismic cables may have a length superior to 1 km, or superior to 4 km, for example about 8 km. The seismic cables have a weight (in the air) of typically about 2700 kg/km and are neutrally buoyant in water, as mentioned above. The lead-in cables have a weight (in the air) of typically about 3300 kg/km and have a negative buoyancy in water.

Variable buoyancy ballasts are installed at intervals along the seismic cable of e.g. 250 meters. The ballasts can be as described in FR2945356A1, which is incorporated herein by reference (notably regarding how such ballasts work). The ballasts may be configured to ensure that at any time the buoyancy error of the cable (i.e. the ratio between the optimal weight of the cable to reach a zero buoyancy and the real weight of the cable) is substantially always inferior to e.g. 1%.

FIG. 1 shows a perspective view of an example 10 of such a marine seismic acquisition system. System 10 comprises a set 101 of parallel seismic cables 110, each in accordance with the above explanations, thereby forming an array of floating cables to acquire seismic signals (receivers), and a seismic source 107 towed by a source boat 109 (i.e. shooting vessel to generate seismic source). In the illustrated example, each cable 110 is connected at its ends to independent ARVs 102 suitable for moving the cable 110 and keeping it under tension, the cable being connected to the ARV via a winch 121, and which incorporate such a control unit. The ARVs 102 thereby position receiving cables and control the array geometry. The control unit is a system comprising a processor coupled to a random-access memory, and implementing a program comprising instructions for controlling the speed of the cable 110. The set 101 of cables 110 is provided with a plurality of sensors/receivers 106 (suitably hydrophone/geophone combinations) capable of collecting said reflected waves. Such a cable 110 may be called a "seismic cable". The cables 110 are positioned in an acquisition station adapted to prospect part of the aforementioned area of the subsoil. The seismic source 107 is triggered. The receivers 106 are used to pick up the reflected waves. It is then possible to operate the ARVs 102 to move the cables 110 to another measuring station adapted to prospect another part of the aforementioned area, and to move the seismic source 107 as well, and so forth. The cables 110 have a neutral buoyancy and are submerged at a depth (i.e., the distance relative to the surface of the water, which surface is not represented on the figure) as defined hereinabove. Each of the cables 110 is suitably provided with ballast-forming elements 119 designed to keep the cable 110 at the desired weight in the water so as to be neutrally buoyant. The ballasts 119 allow the cables 110 to be kept at a predetermined depth profile and to vary it in a controlled manner. Master vessel 111 coordinates overall operations and communicate with the ARVS 102 via antenna 117 provided on an ARV 102.

The positioning of the cables, the source, and/or the control of the ballasts and/or the source may be performed automatically or semi-automatically (e.g. involving to some extent human specialists on-land or on-board e.g. the vehicle towing the source or any nearby vessel via computer program(s) embedded in one or more control units that may receive signals from and/or send signals to any element of the system to which such control unit is coupled (e.g. via radio link for surface communications and physical—e.g. electrical—cable connection for underwater communications). Such control unit(s) may be embedded within any vehicle (e.g. the vehicle towing the source or any nearby vehicle) and/or the ARVs, and/or any other element of any cable for which control is needed.

Figure 2:
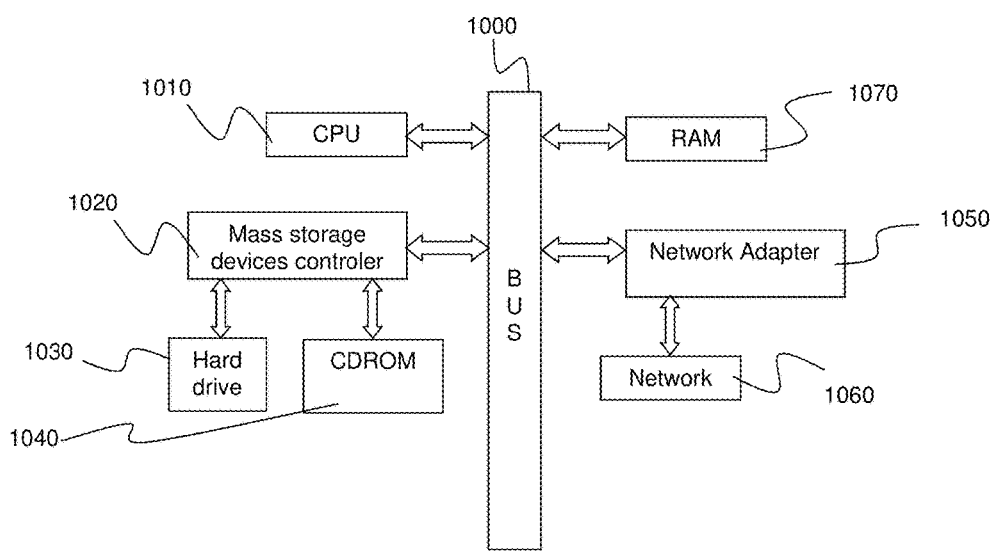
FIG. 2 shows a schematic representation of an example control unit.

FIG. 2 shows an example of such a control unit, embodied as a standard computing system. The control unit of the example comprises a central processing unit (CPU) 1010 connected to an internal communication BUS 1000, a random access memory (RAM) 1070 also connected to the BUS. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A communication adapter 1050 manages accesses to a communication system 1060 (e.g. radio communication system).

The computer program may comprise instructions executable by a computer, the instructions comprising means for causing the source, the seismic cables and/or any other components of the seismic prospecting system to perform any of the methods described herein. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the control unit results in any case in instructions for performing the method steps.

The water surface autonomous vessel may be configured to be connected to an end of a seismic cable having a neutral buoyancy and adapted for midwater data acquisition (as described above), the water surface autonomous vessel being thereby adapted to form a seismic data acquisition system with the seismic cable, and another water surface autonomous vessel (at the other end of the seismic cable), that works according to any combination of the above example methods. This means that the water surface autonomous vessel is adapted, in terms of arrangements, to perform the connection. This also means that the water surface autonomous vessel is adapted, in terms of its mechanical characteristics (and notably rigidity and/or strength and/or power), to perform the above-mentioned positioning. And this may also mean that the water surface autonomous vessel is equipped with a control unit (as mentioned above).

Now, the water surface autonomous vessel may similarly also be adapted to perform a method for controlling depth of the seismic cable, each end of the seismic cable being connected to a respective surface autonomous vessel through a respective lead-in cable having a negative buoyancy, the method comprising continuously varying the deployed length of each lead-in cable with respect to a target depth. This is described in French patent application No. FR1561077 (the content thereof being incorporated herein by reference).

In such a depth controlling method, each end of the seismic cable is connected to a respective surface ARV exerting tension on the cable through (i.e. by/via/with) a respective lead-in cable. The lead-in cables are merely cables mechanically strong enough and adapted to link the seismic cable respectively to the two ARVs, such that the two ARVs and the seismic cable can form a unitary system. Now, the lead-in cables have a negative buoyancy (such that they are heavy and sink in the water) and function as depressors for the seismic cable. The surface ARVs are adapted to float on the surface. The interface water/air is thus useful to the method because the weight of the lead-in cable is supported by the floatation of the ARV (vertical component of the force). The lead-in cables may not embed any ballast (or only at their extremity where they are connected to the seismic cable). Thus, the lead-in cables are used as depressors to make the ends of the seismic cable reach any depth and thereby control their depth, in a relatively quick, efficient, safe and simple manner (compared for example to a ballast-only solution and/or a moving weight solution). Moreover, the lead-in cables perform this function at both ends of the seismic cable. Thus, even in a stationary use the depth is relatively accurate (with respect to the target depth) at both ends. Also, through the lead-in cables, the two ARVs exert tension on the seismic cable at any time (the lead-in cables having an adapted rigidity for that purpose). This way, the method may ensure a control of depth not only for the ends of the seismic cable but also along the cable. In operation, the tension can cooperate with the length varying, e.g. so as to minimize (i.e. this expression encompassing any minimization process, including merely respecting an error threshold constraint) a global depth error along the seismic cable (i.e. a depth error calculated along the seismic cable, such as later-mentioned sum of squares error, as opposed to a depth error calculated merely at the ends of the seismic cable). The tension can thereby be a function of the target depth, the length of the cable, and the buoyancy error along the cable. For example, the tension in the seismic cable is always superior to 100 kgf, e.g. around 300 kgf. To reach such a value, the tail vessel exerts a tension opposite to the direction of the head vessel.

Examples of lead-in cable characteristics that can be implemented include:

Outside diameter higher than 10 mm and/or lower than 50 mm (e.g. 30 mm);

Weight in air: higher than 1 kg/m and/or lower than 5 kg/m (e.g. 3 kg/m);

Weight in water: higher than 0.5 kg/m and/or lower than 4 kg/m (e.g. 2 kg/m); and/or Minimal static curvature radius (that is, when reeled onboard) for an optimal life expectancy higher than 20 cm and/or lower than 60 cm, e.g. 40 cm.

Minimal dynamic curvature radius (that is, during use under tension) for an optimal life expectancy higher than 40 cm and/or lower than 80 cm, e.g. 60 cm.

The target depth can be any depth value predetermined for the seismic acquisition to be performed and between 0 and 300 meters (e.g. any value superior to 5 meters or 20 meters and/or inferior to 300 meters). The lead-in cables may thus present a corresponding length.

The method is implemented in the water, e.g. where sea currents can vary through time. The dimensions at stake can also influence stability of the system. Also, any target depth is particularly difficult to achieve in the stationary or pseudo-stationary context. A technical difficulty to control depth is indeed linked to the fact that the system may have to be stationary or pseudo-stationary in the 2D horizontal plane and static in the vertical plane. As explained earlier, the seismic cable includes remotely controlled ballasts along the cable. The primary function of such ballasts is to control the depth of the seismic cable (referred in the following to as "MSC", as in Midwater Stationary Cable) when the lead-in cable heads are at the correct depth. In effect, the ballasts may first perform a static correction of the initially globally non-neutral buoyancy of the seismic cable (e.g. the seismic cable being designed to be of neutral buoyancy in fresh water, but then provided with weights for the salt water use where the buoyancy is not perfectly neutral as such in the general case). But the ballast may also perform a dynamic correction of local variations of buoyancy of the seismic cable. In specific, the ballasts compensate the variations in the water density (e.g. due to temperature salinity and/or currents variations) so as to maintain the seismic cable as neutrally buoyant as possible. However, the ballasts are not mechanically designed to compensate the weight of the lead-in cables, which the method performs in effect by varying the deployed length of these lead-in cables (thereby controlling depth of the ends of the seismic cable, the depth along the cable being controlled by the ballasts and the tension). Also, in some situations the depth may vary due to the environment and the ballasts may not be prompt/responsive enough to correct it, so as to achieve an accurate controlled depth, typically within +/−1 meter with respect to the target depth. In such a situation, the method may also comprise dynamically (e.g. continuously, e.g. real-time) varying the deployed length of each lead-in cable with respect to a target depth, and/or adapting the tension accordingly to minimize the global error.

In an example, the principle of the method thus consists in having a motorized winch integrated into each ARV to deploy more or less (lead-in) cable and a control mechanism to deploy the correct length of (lead-in) cable to achieve the target depth. As mentioned earlier, given the requirements of the context of use, the target depth for the tail ARV could be different than the target depth of the head ARV. Hence the system is in an example extremely flexible and tunable.

Figure 3:
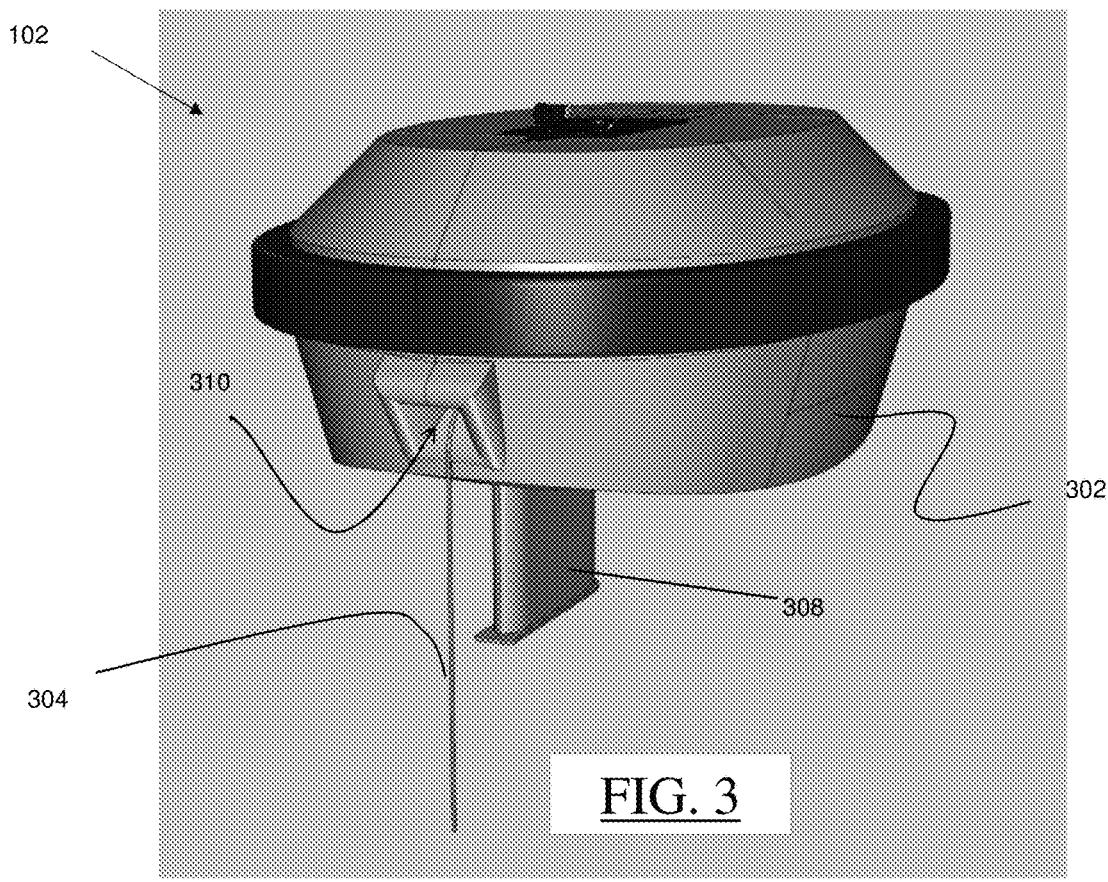
FIGS. 3-8 illustrate examples of the water surface autonomous vessel.
Figure 4:
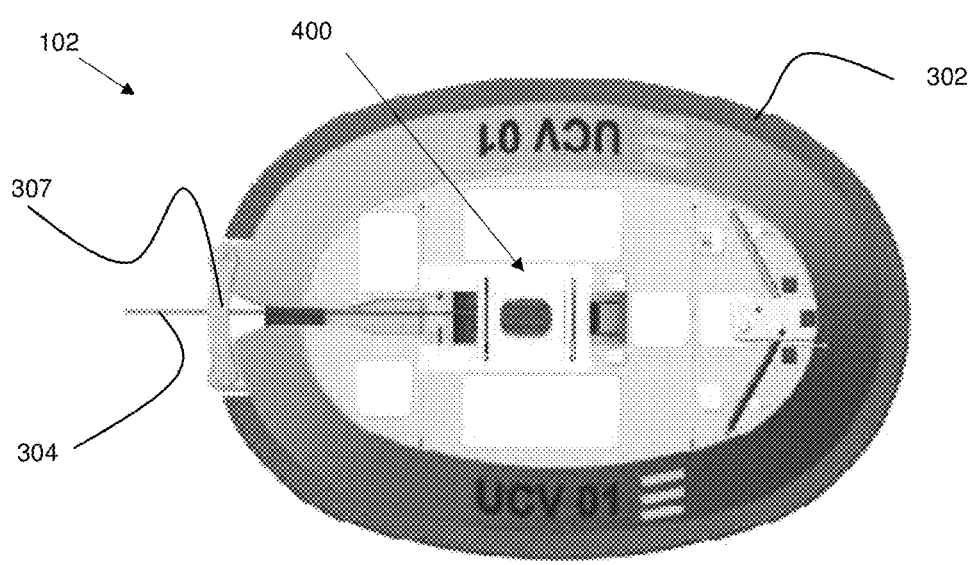
Figure 5:
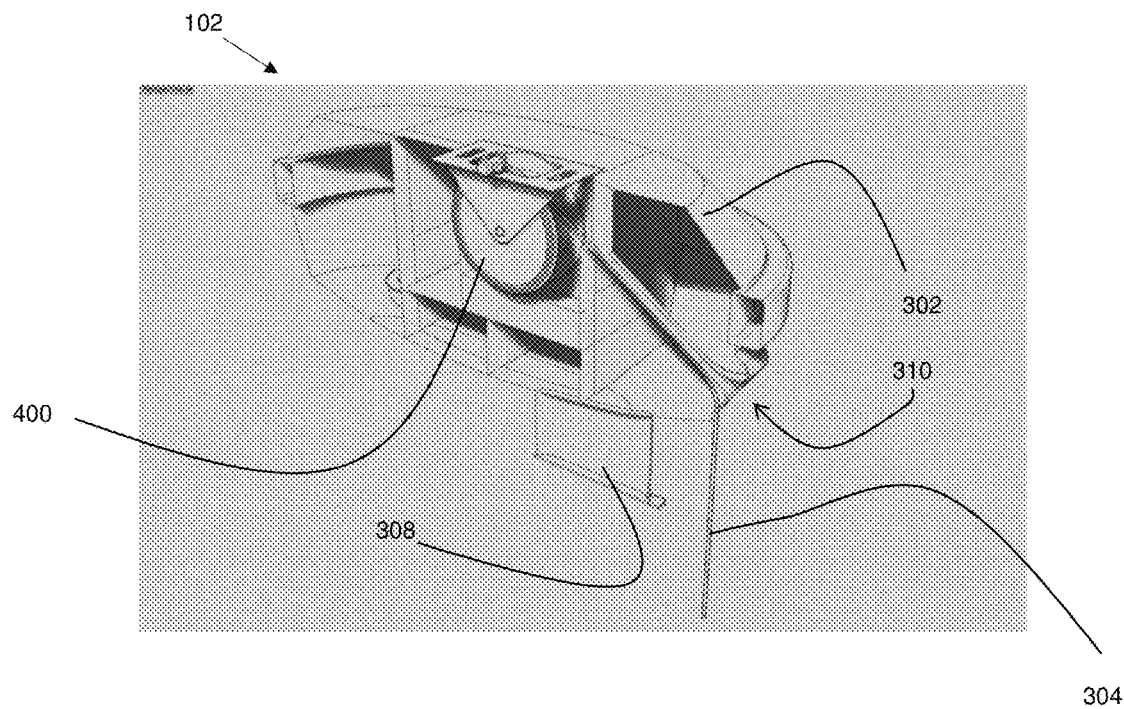
Figure 6:
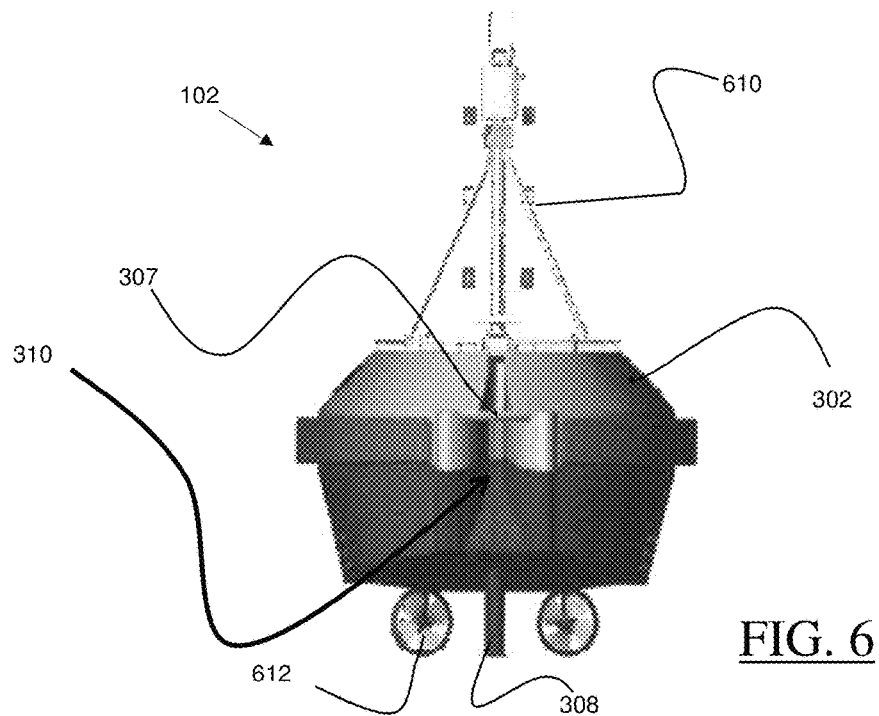

FIGS. 3-6 illustrate examples of the water surface autonomous vessel 102, with different features that can be combined together. FIG. 3 shows a perspective view. FIG. 4 shows a top view. FIG. 5 shows a perspective longitudinal section view. And FIG. 6 shows a back view.

As shown on the figures, water surface autonomous vessel 102 has a hull 302 and is configured to be connected to an end of a seismic cable (not represented on the figures) via a lead-in cable 304 (whose portion is represented on some of the figures, for the purpose of illustration). Hull 302 is configured to provide a positive floatability to water autonomous vessel 102 and thus a stable positioning of the vessel on the water surface, the floatability being high enough to support the weight at least of lead-in cable 304 and the mechanical tension induced by the lead-in cable 304.

Water surface autonomous vessel 102 comprises a winch 400 (which is represented in some of the figures). Winch 400 is arranged on water surface autonomous vessel 102 so as to accommodate the entire length of lead-in cable when it is not deployed and to enable the deployed length of lead-in cable 304 to be varied. In specific, winch 400 is configured to rotate and reel in or pay out lead-in cable length, so as to variably and continuously deploy the desired length of lead-in cable 304, notably to control depth of the seismic cable. Winch 400 can be (de)activated and/or controlled manually and/or automatically, thanks to appropriate equipment on-board autonomous vessel 102.

As shown on the figures, in the example water surface autonomous vessel 102 may also comprise mast 610 that may include antenna(s) to communicate (e.g. via radio communication) with other autonomous vessel(s) and/or a master vessel. Also, water surface autonomous vessel 102 comprises propulsion tools 612 (e.g. propellers) and/or hull 302 may be equipped with a direction control tool 308 (e.g. a keel or skeg). These elements may be used to control positioning of the seismic cable (as explained earlier), and notably its stationary or pseudo-stationary positioning (e.g. with respect to the water bottom).

Owing to the contemplated applications, water surface autonomous vessel 102 is relatively small in terms of size (as mentioned earlier). In this context, hull 302 of autonomous vessel 102 is designed so as to form a conduct 310 in the lower part of the (e.g. bottom) back of autonomous vessel 102 (with respect to the floating of autonomous vessel and to its moving direction) in the direction of deployment of the lead-in cable (e.g. the average deployment direction during use may define the conduct principal axis). In other words, the structure of hull 302 forms conduct 310 provided for the passage of the lead-in cable. Forming unitarily the conduct within hull 302 allows economy of space (relative to boats which embed a fairlead to deploy a cable controlled with a winch). Similarly, winch 400 is contained in the example of FIG. 5 inside the space/volume defined by hull 302 so as to occupy relatively little space and have a compact structure.

In the examples, the surface of conduct 310 in contact with lead-in cable 304 (when deployed)—i.e. inner surface of conduct 310—provides smooth support for the lead-in cable. By "smooth support", it is meant that the surface of conduct 310 does not present any discontinuity such as sharp edge encountering/intersecting (e.g. substantially perpendicular to) the lead-in cable 304, when lead-in cable 304 is deployed, and is compatible with the bending constraint of the lead-in cable (minimum bending radius) which must be satisfied so as to minimize the mechanical fatigue of lead-in cable and thereby maximizes its lifetime.

In the context of the different methods described above, autonomous vessel 102 can be used in a stationary or pseudo-stationary context. Unlike towing technology, in such a context the influence of current variations and/or waves is particularly important, and it can lead to sudden horizontal (i.e. lateral) and/or vertical displacements of the lead-in cable (and thus sudden changes in the deployment direction of the lead-in cable). Furthermore, the contemplated seismic cable target depths can be relatively high (up to 500 m or 300 m) and variable. For these reasons, and as water surface autonomous vessel 102 can move in the water with six degrees of freedom (all three translations and all three rotations being possible to some extent), lead-in cable 304 can often take support and/or hurt contours (i.e. inner surface, e.g. walls) of conduct 310 (the only fixed point(s) of lead-in cable being inside hull 302, for example the lead-in cable 304 being fixed only at its connection with winch 400 and otherwise free and only constrained by the geometry of its surrounding space/volume and notably geometry of conduct 310). Tests performed show that the smooth design of conduct 310 is effective to minimize the consequences of these phenomena due to the stationary context leading to a mechanical/flex fatigue of lead-in cable 304, notably because the shocks propagate within the lead-in cable (the propagation incidentally also creating a noise that disturbs the data acquisition as well).

As can be seen particularly on FIG. 5 (and also on later-discussed FIGS. 7-8), this smoothness can be achieved by (or combined to) a conduct 310 which can have a first (inner) part of constant circular cross-section followed by a second (outer) part flared toward its exit (the exit being the aperture of conduct 310 on the surrounding water—i.e. in the back of autonomous vessel 102). By "flared", it is meant that the cross-section of the conduct continuously increases in the direction toward the exit, and for example the conduct may have an internal surface of G1 or even G2, or yet C1 or C2 continuity (see an example definition thereof at the following URL: https://en.wikipedia.org/wiki/Smoothness) at least in the direction towards the exit (e.g. at least in areas encountered by lead-in cable 304). In other words, the flaring provides a vase-like shape to conduct 310. As the context of use provides a certain freedom of move to lead-in cable 304 and thereby reach relatively high angles both horizontally and vertically (high-enough and adapted to the sometimes particularly high depth(s) and tension(s) contemplated for seismic cable and/or sometimes particularly tight and/or sudden heading changes operated by autonomous vessel 102, both specific to the stationary context), the flaring allows the bending of lead-in cable 304 to be progressive and thereby relatively reduces mechanical stresses on the lead-in cable. The flaring can itself be progressive and increasing (i.e. conduct 310 is flared more and more intensively), yet increasing progressivity of the bending and reduction of stresses. Example dimensions are provided later.

As shown on FIG. 3 and FIG. 6, conduct 310 may have a (substantially) U-shaped or quadrilateral cross-section (substantially square in the case of FIG. 3 and substantially rectangular U-shaped in the case of FIG. 6). This way, the flaring is performed in horizontal and vertical plane directions. In other words, conduct 310 is made of at least a bottom face (with in addition an upper face in the example of FIG. 3) and two lateral faces. The bottom face, upper face if provided, and/or any or both of the two lateral faces can be planes, possibly curved (as the flaring can be progressive and increasing). Conduct 310 may thus present the shape of a non-straight frustum (the vase-like shape having at least three longitudinal sharp edges), with walls thereof (e.g. at least bottom wall and lateral walls, possibly all four walls thus including top wall as well) cambered toward the interior of conduct 310. This configuration is simple to form (in terms of manufacturing costs) and yet takes into account the main stresses that lead-in cable 304 undergoes (corresponding to either a downward bending toward the connection with the seismic cable in a vertical plane—e.g. corresponding to deep positioning of the seismic cable- and/or a lateral bending in a substantially horizontal plane—e.g. corresponding to tight heading changes by autonomous vessel 102).

As shown in FIG. 5, in another configuration conduct 310 may have a circular or ellipsoid cross-section (this encompassing all closed and second-derivative smooth curves, for example circles, ellipses and ovals), the flaring thereby forming a trumpet-like shape (e.g. possibly a rotational symmetrical shape in case the cross-section is circular). This configuration enables conduct 310 to provide the desirable smooth support for the lead-in cable 304, whichever the bending direction that the lead-in cable 304 undergoes.

Figure 7:
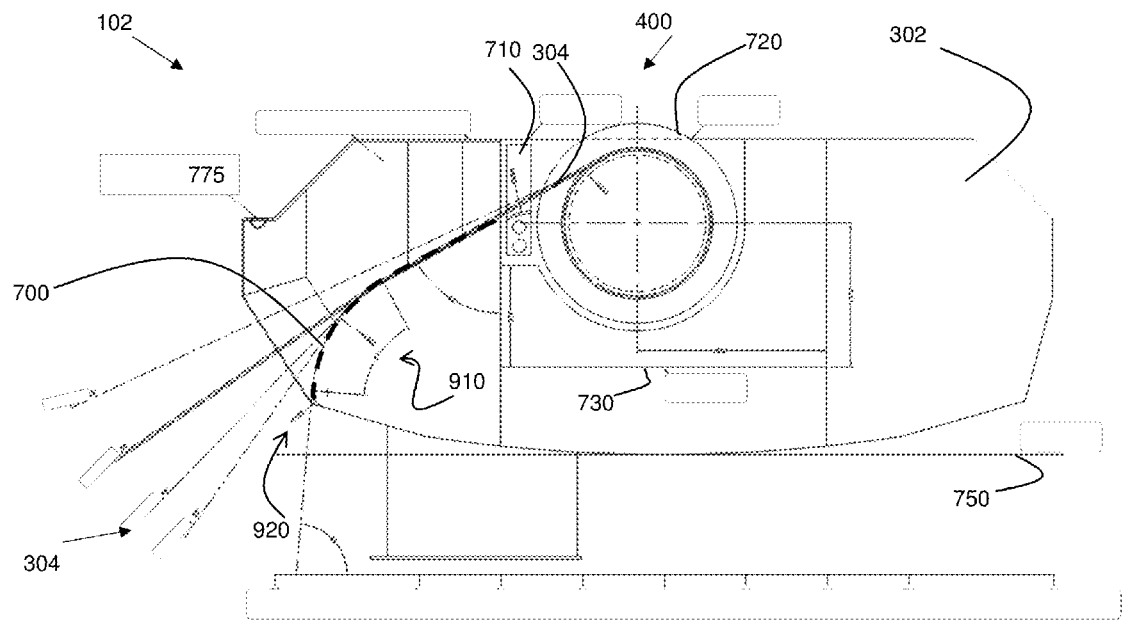
Figure 8:
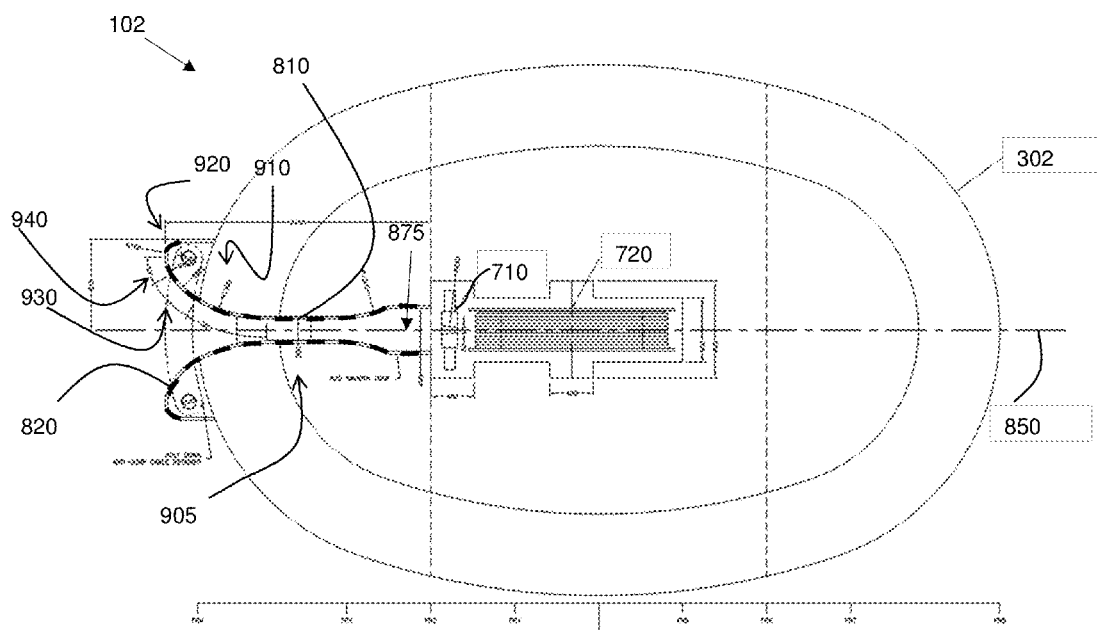

An example of dimensions that can be applied to any of the above configurations and that work particularly well in reducing fatigue due to bending and hurting of lead-in cable 304 on inner surface (e.g. walls) of conduct 310 are now discussed with reference to FIGS. 7-8. Distances are provided in millimeters on the figures, and angles in degrees (with respect to a center defined by a local radius when the angle is provided as a portion of a curve, or with respect to baseline 750 otherwise). FIG. 7 shows a longitudinal and vertical section drawing of winch 400 (including winch spooling gear 710 and winch drum 720) above tank top 730 and lead-in cable 304 integrated inside hull 302 of autonomous vessel 102. FIG. 8 shows a top view of a longitudinal section drawing of winch 400 integrated inside hull 302 of autonomous vessel 102.

In this example, the hull design uses a vertical flaring curve 700 that corresponds to the curve of the conduct where lead-in cable 304 is supported when the lead-in cable tends to be vertical, and two symmetrical lateral flaring curves 810 and 820 that each correspond to the curves of the conduct where the lead-in cable is supported when the lead-in cable tends to be moved laterally relative to the direction of the autonomous vessel.

Curves 700, 810 and 820 are represented in dotted lines on the figures. These curves are merely curves of inner surface of conduct 310 that extend longitudinally and that guide the flaring, since the flaring (or the inner surface of surface of conduct 310) is designed so as to (geometrically) interpolate them (the interpolation being performed in any way as long as it respects the provided requirements, including smoothness requirements). Curve 700 is called "vertical flaring curve" merely because it corresponds to how conduct 310 flares vertically and to vertical displacements of lead-in cable 304, that is, curve 700 is contained in a vertical symmetrical plane of autonomous vessel 102 (projected into line 850 on FIG. 8). Curve 700 is geometrically the intersection between a vertical symmetric plane of conduct 310 (i.e. the plane along which the cross-section of FIG. 7 is performed) and bottom inner face of conduct 310. Curves 810 and 820 are geometrically each a respective intersection between a substantially horizontal symmetric plane of conduct 310 (i.e. the plane along which the cross-section of FIG. 8 is performed) and a respective lateral face of conduct 310. Curves 810 and 820 are symmetrical (with respect to said vertical symmetrical plane projected into line 850 on FIG. 8). Curves 810 and 820 are called "lateral flaring curves" merely because they correspond to how conduct 310 flares laterally and to lateral displacements of lead-in cable 304, and they are contained in a plane orthogonal to said vertical symmetrical plane projected into line 850 on FIG. 8.

More specifically, curves 700, 810 and 820 are defined as where on inner surface of conduct 310 lead-in cable 304 is to take support. The skilled person can thereby understand how to define such curves, and thus constrain the geometry of conduct 310. Notably, curve 700 corresponds to the curve of conduct 310 where lead-in cable 304 is supported when lead-in cable 304 tends to be vertical (toward the bottom of the sea, being noted that autonomous vessel 102 can include bolt-down anti-jump retainer 775 to better avoid that the cable get out of the winch and of the autonomous vessel). Curves 810 and 820 correspond to the curve of conduct 310 where lead-in cable 304 is supported when, at any contemplated depth for seismic cable (e.g. such that lead-in cable 304 forms any angle with base line 750, for example any angle higher than 0° and/or lower than 60°, for example higher than 25° and/or lower than 40°), lead-in cable 304 is moved laterally (substantially horizontally, e.g. so as to rotate around autonomous vessel 102 with respect to a vertical rotational axis or due to autonomous vessel yaw motion, i.e. wave induced motion leading to vessel heading variations). It is noted that the angle between lead-in cable 304 and base line 750 depends notably on the mechanical tension in the cable and the weight of deployed lead-in cable 304, these quantities being linked to the speed of autonomous vessel 102 (even if stationary or pseudo-stationary, as there can be a current). Curves 810 and 820 can be designed according to any value for such angle, but also to a most frequent value (to increase accuracy of the result). Curves 810 and 820 are not linked to the angle with base line, only the height of the U-shape depends on the extreme values of this angle. Curves 810 and 820 are designed by considering the probability distribution function of the exit angle of the lead-in cable in the horizontal plane. Indeed smaller radiuses are tolerated at the exit because it is much less probable that the lead-in cable bends over these small radiuses.

In the configuration where conduct 310 has a substantially U-shaped or quadrilateral cross-section, the flaring thereby forming two pairs of faces, the two faces of a respective pair facing each other, bottom face can be formed by a lateral/horizontal translation of curve 700, and lateral faces can be formed by a vertical translation of curves 810 and 820, the faces thus formed being joined in any way. It is noted that the top face may be formed in any way, as lead-in cable 304 generally does not encounter it. Notably, in the example of FIG. 4 and FIG. 6, the conduct 310 has a substantially U-shaped quadrilateral cross-section, with two lateral faces, a bottom face, and, rather than a top face, merely a horizontal bar 307. The bar has usually a round shape to avoid any cable damage in case of shocks and its radius is preferably compatible with the minimum bending radius of the cable.

Now, FIGS. 7-8 provide different dimensions that are compatible with a desired maximum curvature that lead-in cable 304 undergoes so as to reduce its fatigue, and that are adapted to the relatively small size of autonomous vessel 102. As mentioned earlier, the flaring can be progressive, such that curves 700, 810 and 820 can be convex (with respect to the main axis of conduct 310), as it is the case in the example of the figures. In the figures, as the curves go toward the exit of conduct 310, the curvature radius even becomes smaller. This is because the likelihood that the cable is in contact with these portions of the curves is small and tension in lead-in cable 304 is generally lower when such areas of conduct 310 are encountered, a smaller curvature radius is thus more acceptable.

Indeed the design of the hull aims at maximizing the lifetime of the lead-in cable. The expected life time depends on the number of bending cycles at different tensions. According to the Miner's rule, where there are k different stress magnitudes in a spectrum, $S_i$ (1≤i≤k), each contributing $n_i(S_i)$ cycles, then if $N_i(S_i)$ is the number of cycles to failure of a constant stress reversal Si, failure occurs when:

$$\sum_{i=1}^{k} \frac{n_i}{N_i} = C$$

C is a constant and is experimentally found to be between 0.7 and 2.2. Usually for design purposes, C is assumed to be 1.

The fatigue of the cables are generally characterized by a Wöhler curve that gives the number of cycles (N) as a function of the ratio between the tension and the breaking strength (T/BS). The curve is generally assumed to be composed of straight lines in log-log scale. Otherwise stated it means that for a given radius, the number of cycles that a cable can tolerate noticeably increases when the working tension is lowered to a domain far from the breaking tension.

The relative service life of a cable significantly depends on the ratio between the sheave diameter and the cable diameter (D:d ratio)—generally it is assumed that the relative service life increases with the square of that ratio. Otherwise stated, it means that for a given tension, the number of cycles that a cable can tolerated noticeably increases with the bending radius.

In the water surface autonomous vessel application, the bending cycles for the lead-in cable are due to wave induced motions (yaw motion around the vertical axis in the horizontal plane and pitch motion around the horizontal axis in the vertical plane—note that roll motion do not induce bending cycle of the lead-in cable). The period of the cycles are in the order of a few seconds or tens of seconds, e.g. larger than 1 second and smaller than 30 seconds, or more frequently larger than 3 seconds and smaller than 15 seconds. The cycle periods are small compared to the expected usage time of the lead-in cable in the order of several or tens of years. In other words the number of cycles may reach several millions, tens of millions, or hundreds of millions, or even more. The fatigue consideration and the cable life time optimization is therefore extremely dimensioning for the hull design.

Dimensions on the figures can all be modified, for example by plus and/or minus 20% (i.e. +/−20%), as long as connections are ensured (that is, the modifications on one dimension are mirrored accordingly on other modifications, so as to preserve coherence of the whole geometry). In a specific example compatible with the dimensions provided on the figures, curve 700 and/or curves 810 and 820 each comprise a beginning section 910 where the curvature radius is higher than 500 mm and/or lower than 2000 mm and/or an end section 920 where the curvature radius is higher than 10 mm and/or lower than 300 mm. Beginning section 910 is not necessarily at the starting section of conduct 310, but it corresponds to the beginning of the bending of the lead-in cable 304. As on the figures, it can be preceded by a straight portion (i.e. if infinite curvature radius) curve 700 and/or curves 810 and 820 (corresponding to a cylinder-like constant diameter portion 905 of conduct 310 toward winch 400). End section 920 has a relatively low curvature radius and thus may lead to a tight bending of lead-in cable 304, but as this bending should occur relatively rarely, this is acceptable (end section 920 actually constitutes a safety pivot in case of extreme behaviors). The shape of the end section 920 is to ensure that the lead-in is not damaged with sharp angles: the hull design is smooth and presents some of form of continuity (G1 or G2 or G3). In the example of the figures, curves 810 and 820 each further comprise a first intermediate section 930 where the curvature radius is higher than 200 mm and lower than 1000 mm, and a second intermediate section 940 where the curvature radius is higher than 250 mm and/or lower than 400 mm.

In other words, conduct 310 comprises, in the order encountered by paid out lead-in cable 304, a straight portion 905 (i.e. cylinder-like constant diameter portion) that prevents any bending of lead-in cable 304 (i.e. straight walls, extending with a nil-flaring), and then increasingly flaring portions, that authorize larger bending, so that the bending is correctly regulated and relatively low stress is imposed on lead-in cable 304. It is also worthy to note that the vertical flaring may be non-uniform with respect to the lateral flaring.

Also worth mentioning is the fact that conduct 310 may comprise a base portion 875 that is slightly larger than the straight portion 905 of conduct 310 and forms a smooth edge facing winch 400, such that conduct 310 can receive lead-in cable 304 payed out by winch 400 as a funnel, yet smoothly and thus with relatively low stresses on lead-in cable 304.

The invention claimed is:

1. Water surface autonomous vessel, the vessel comprising a control unit for autonomous positioning and a hull, the vessel being configured to be connected, through a lead-in cable having a negative buoyancy, to an end of a seismic cable having a neutral buoyancy and adapted for midwater data acquisition and to exert a tension at the end of said seismic cable for controlling the midwater position thereof, wherein the water surface autonomous vessel further comprises a winch for varying the deployed length of the lead-in cable, and the hull of the autonomous vessel forms a conduct at the back of the autonomous vessel in the direction of deployment of the lead-in cable.

2. The autonomous vessel of claim 1, wherein the surface of the conduct in contact with the lead-in cable provides smooth support for the lead-in cable.

3. The autonomous vessel of claim 2, wherein the conduct is flared toward the exit of the conduct.

4. The autonomous vessel of claim 3, wherein the conduct has a substantially U-shaped or quadrilateral cross-section, the flaring thereby forming at least a bottom wall and a pair of lateral walls facing each other.

5. The autonomous vessel of claim 3, wherein the conduct has a circular or ellipsoid cross-section, the flaring thereby forming a trumpet.

6. The autonomous vessel of claim 3, wherein the hull design uses a vertical flaring curve that corresponds to the curve of the conduct where the lead-in cable is supported when the lead-in cable tends to be vertical, and two symmetrical lateral flaring curves that each correspond to the curves of the conduct where the lead-in cable is supported when the lead-in cable tends to be moved laterally relative to the direction of the autonomous vessel or due to vessel yaw motion.

7. The autonomous vessel of claim 4, wherein the hull design uses a vertical flaring curve that corresponds to the curve of the conduct where the lead-in cable is supported when the lead-in cable tends to be vertical, and two symmetrical lateral flaring curves that each correspond to the curves of the conduct where the lead-in cable is supported when the lead-in cable tends to be moved laterally relative to the direction of the autonomous vessel or due to vessel yaw motion.

8. The autonomous vessel of claim 5, wherein the hull design uses a vertical flaring curve that corresponds to the curve of the conduct where the lead-in cable is supported when the lead-in cable tends to be vertical, and two symmetrical lateral flaring curves that each correspond to the curves of the conduct where the lead-in cable is supported when the lead-in cable tends to be moved laterally relative to the direction of the autonomous vessel or due to vessel yaw motion.

9. The autonomous vessel of claim 6, wherein the vertical flaring curve and/or the horizontal flaring curves each comprise a beginning section where the curvature radius is higher than 500 mm and/or lower than 2000 mm and/or an end section where the curvature radius is higher than 10 mm and/or lower than 300 mm.

10. The autonomous vessel of claim 9, wherein the horizontal flaring curves each further comprise a first intermediate section where the curvature radius is higher than 200 mm and lower than 1000 mm.

11. The autonomous vessel of claim 10, wherein the horizontal flaring curves each further comprise a second intermediate section where the curvature radius is higher than 250 mm and/or lower than 400 mm.

12. The autonomous vessel of claim 7, wherein the vertical flaring curve and/or the horizontal flaring curves each comprise a beginning section where the curvature radius is higher than 500 mm and/or lower than 2000 mm and/or an end section where the curvature radius is higher than 10 mm and/or lower than 300 mm.

13. The autonomous vessel of claim 12, wherein the horizontal flaring curves each further comprise a first intermediate section where the curvature radius is higher than 200 mm and lower than 1000 mm.

14. The autonomous vessel of claim 13, wherein the horizontal flaring curves each further comprise a second intermediate section where the curvature radius is higher than 250 mm and/or lower than 400 mm.

15. The autonomous vessel of claim 8, wherein the vertical flaring curve and/or the horizontal flaring curves each comprise a beginning section where the curvature radius is higher than 500 mm and/or lower than 2000 mm and/or an end section where the curvature radius is higher than 10 mm and/or lower than 300 mm.

16. The autonomous vessel of claim 15, wherein the horizontal flaring curves each further comprise a first intermediate section where the curvature radius is higher than 200 mm and lower than 1000 mm.

17. The autonomous vessel of claim 16, wherein the horizontal flaring curves each further comprise a second intermediate section where the curvature radius is higher than 250 mm and/or lower than 400 mm.

\* \* \* \* \*